Nov. 11, 1952     J. B. KUCERA     2,617,661
DUAL WHEEL STEERING SYSTEM
Filed Oct. 5, 1950
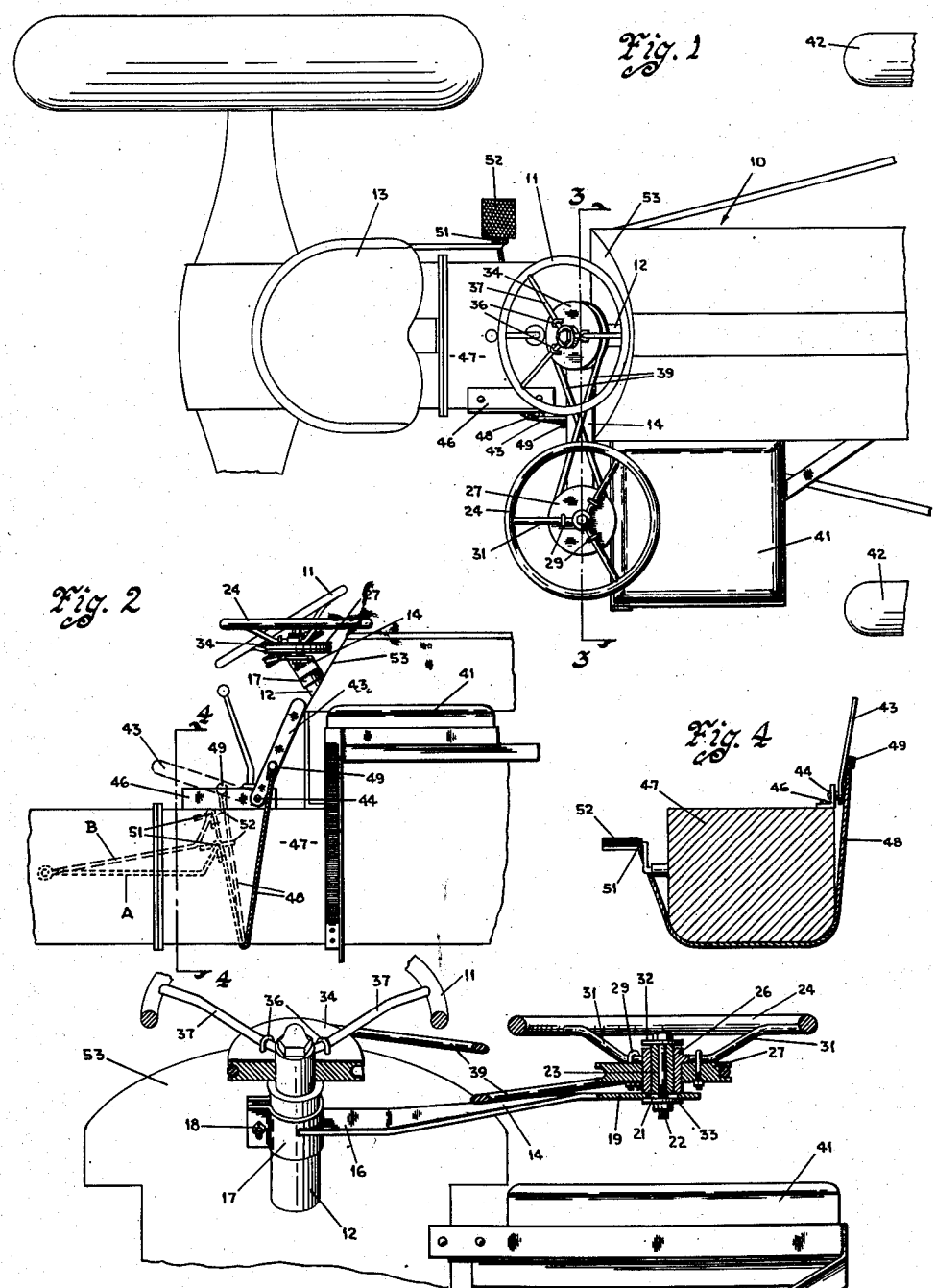
Inventor
Joseph B. Kucera
By    Rudolph L. Lowell
Attorney Patented Nov. 11, 1952

2,617,661

UNITED STATES PATENT OFFICE 2,617,661

DUAL WHEEL STEERING SYSTEM

Joseph B. Kucera, Traer, Iowa

Application October 5, 1950, Serial No. 188,540

2 Claims. (Cl. 280—87)

This invention relates generally to a vehicle steering system and in particular to a dual wheel steering system for a farm tractor.

Farm tractors such as John Deere, Ford, and Ferguson tractors, are equipped with rear end power lift units having rearwardly extended pivoted arms or frame structures for attaching to farm implements, such as plows, cultivators, discs and the like. These farm implements are in a tow relation relative to the tractor so as to be in operation when the tractor is advanced or driven forwardly.

In order to utilize the power lift unit of the above mentioned tractors, many implements which in operation are usually pushed by the tractor, such as loader units, bulldozers, windrowers and the like, have been mounted on the pivoted frame structures of the power units, and then operated by driving the tractor in reverse. This reverse driving results in much inconvenience to the tractor operator, both as a result of the reverse manipulation of the tractor steering wheel, and the necessity of the operator looking back from his position on the tractor seat.

It is an object of this invention, therefore, to provide an improved dual wheel steering system for steering a tractor in either a forward or a reverse direction.

A further object of this invention is to provide a reverse drive steering attachment for a tractor the steering wheel of which is manipulated in all respects similar to the forward drive steering wheel on the tractor.

Still another object of this invention is to provide a reverse drive steering apparatus for a tractor which in no way interferes with the forward drive steering apparatus, so that either steering apparatus can be used as required by the tractor operator.

Yet a further object of this invention is to provide a rear driving steering attachment for a tractor which is of a simple and economical construction, applicable to many types of farm tractors, easily and quickly installed, and efficient in operation to steer a tractor for a reverse travel thereof without any inconvenience to the tractor operator in his control of the tractor.

Further objects, features and advantages of this invention will become apparent from the following description when taken in connection with the accompanying drawing in which:

Fig. 1 is a foreshortened fragmentary plan view of a tractor showing the assembly therewith of the reverse drive steering attachment of this invention;

Fig. 2 is a side elevational view of the assembly shown in Fig. 1;

Fig. 3 is an enlarged sectional detail view taken along the line 3—3 in Fig. 1; and Fig. 4 is a detail sectional view as seen on the line 4—4 in Fig. 2.

With reference to Figs. 1 and 2 of the drawings the attachment of this invention is illustrated in assembly relation with a tractor, designated generally as 10, and provided with a forward drive steering apparatus including a steering wheel 11, and a steering column 12 therefor. An operator's seat 13, for use in connection with the forward drive steering wheel 11, is carried on the tractor rearwardly of such wheel.

The attachment of this invention (Fig. 3) includes a supporting arm 14 terminating at one end 16 in a tubular split clamp 17 by which the arm 14 is secured to the steering column 12. The clamp 17 is tightened about the steering column 12 by a clamping bolt 18. The opposite end 19 of the supporting arm 14 is formed with a longitudinally extended slot 21 through which is extended a clamping bolt assembly 22. Mounted about the bolt assembly 22, and positioned on the top side of the supporting arm 14 is an upright tubular bearing member 23.

Rotatably supported about the bearing member 23 is a reverse drive steering wheel 24 the hub section 26 of which fits loosely about the bearing 23. Mounted about the hub section 26 is a V-belt pulley 27. The pulley 27 is secured to the steering wheel 24, for rotation therewith, by U-clamps 29 extended about the wheel spokes 31 and projected through the pulley 27. The clamping bolt assembly 22 includes washers 32 and 33 which are engageable with the top side of the bearing 23 and the underside of the supporting arm 14, respectively, so that the wheel 24 and pulley 27 are freely rotatable as a unit about the bearing 23 in a supported position on the top side of the arm 14. An operator's seat 41 is carried at one side of the tractor 10 at a position forwardly of the steering wheel 24.

Mounted about the steering column 12 at a position below the forward steering wheel 11 is a second V-belt pulley 34 which is secured to the steering wheel 11 for rotation therewith by U-clamps 36 positioned about the steering wheel spokes 37, and extended through the pulley 34. A V-belt 39 is connected between the pulleys 27 and 34 in a crisscross relation so that the steering wheels 11 and 24 are reversely rotated, namely, on rotation in one direction of either steering wheel 11 or 24, the other steering wheel is rotated in an opposite direction. The tension in the belt 39 is varied by adjustment of the bolt assembly 22 longitudinally of the slot 21.

As best appears from Figs. 2 and 3 it is seen that the supporting arm 14 has the end portions 18 and 19 thereof offset laterally of the arm to provide for the support of the reverse drive steering wheel 24 in a substantially horizontal plane relative to the inclined support of the forward drive steering wheel 11 on the steering column 12. Further it is to be noted that the arm 14 extends transversely of the tractor 10 from one side of the steering column 12.

In the operation of the attachment of this invention on a rotation of the steering wheel 24 to steer the tractor for a reverse travel thereof the tractor front wheels 42 are turned in a direction corresponding directly to the turning action of the wheel 24. Stated otherwise, when the tractor, for a reverse travel thereof, is to be steered to the left, as viewed in Fig. 1, the steering wheel 24 is also rotated to the left or in a counterclockwise direction. However, by virtue of the reverse rotation of the steering wheels 11 and 24 the tractor front wheels 42 are turned in a direction normally providing for a right turn of the tractor when the tractor is operated in a forward direction. In like manner, for a right turn of the tractor, when the tractor is operated in a reverse direction, rotation of the steering wheel 24 in a clockwise direction, as viewed in Fig. 1, turns the tractor front wheels 42 in a direction corresponding to a left hand turn for a forward advance of the tractor.

The tractor operator is thus without any inconvenience in manipulating the wheel 24, relative to the direction of the turn desired, for a reverse travel of the tractor, as would be encountered when the steering wheel 11 alone is utilized for a reverse travel of the tractor.

To further aid the tractor operator in his full control of the tractor for a reverse travel thereof there is provided a hand operated clutch lever 43 located intermediate the steering wheels 11 and 24. The lever 43 is mounted for pivotal movement in a direction fore and aft of the tractor on a pivot pin 44 carried in a bracket 46 mounted directly on a portion of the tractor housing 47. A cable 48 has one end 49 connected directly to the clutch lever 43, at a position intermediate the ends of the lever, and then travels directly underneath the tractor housing 47, as shown in Fig. 4, for connection of its opposite end 51 with the usual foot operated clutch pedal 52 of the tractor.

When the lever 43 is moved to its full line position shown in Fig. 2, the clutch pedal 52 is moved to its "in" position shown in dotted lines at A. At this position the clutch lever 43 engages the tractor instrument panel 53 and by virtue of the off-center position of the cable connection 49 relative to the pivot 44, positively holds the clutch pedal 52 against movement to its "out" position.

To permit movement of the clutch 52 from its "in" position shown in dotted lines at "A" in Fig. 2, to its "out" position shown in dotted lines at "B" in the same figure, the clutch lever 43 is moved from its full line position to its dotted line position, also shown in Fig. 2. With the clutch lever in its dotted line position, it is seen that the cable connection 49 is again in an off-center relation relative to the pivot 44 so as to be biased in a direction which retains the "out" position of the clutch pedal 52.

From the above description it is seen that the invention provides a dual steering wheel system for a tractor, in which a reverse drive steering attachment is readily assembled with and removed from the forward drive steering apparatus with which the tractor is originally equipped. It is to be further noted that the steering wheels 11 and 24 are operable independently of each other so that it is only necessary for the tractor operator to change his seating position from the seat 13 to the seat 41 in order to have full control of the tractor, and full vision in the direction of tractor travel.

Although the invention has been described with respect to a preferred embodiment thereof it is to be understood that it is not to be so limited since changes can be made therein which are within the full intended scope of this invention as defined by the appended claims.

I claim:

1. In combination with a tractor having a forward drive steering wheel, a steering column therefor and an operator's seat located rearwardly of said forward drive steering wheel, a reverse drive steering apparatus including a supporting arm extended transversely of the tractor, means adjustably securing one end of said arm to said steering column for rotation about said steering column, said arm being arranged below and adjacent to said forward drive steering wheel, and with the opposite end of said arm terminating at one side of said tractor, a reverse drive steering wheel, means for rotatably mounting said reverse drive steering wheel on said opposite end of the arm, a pair of pulleys corresponding to said steering wheels, with a pulley being secured to a corresponding wheel at a position below such wheel, a belt connection between said pulleys, and an operator's seat carried on the tractor forwardly of said reverse drive steering wheel, with said arm being adjustable to provide a predetermined operator's clearance between said reverse driving steering wheel and said last mentioned operator's seat.

2. A reverse drive steering attachment for a tractor having a forward drive steering apparatus including a steering wheel, said attachment comprising an arm member, means for securing one end of said arm member to said tractor, a first pulley mounted on said forward drive steering wheel in axial alignment with and below said forward drive steering wheel, a reversed drive steering wheel rotatably supported at the other end of said arm member, a second pulley mounted on said reverse drive steering wheel in axial alignment with and below said reverse drive steering wheel, a cross belt connection between said two pulleys, and means for adjustably moving said reverse drive steering wheel and said second pulley longitudinaly of said arm member as a unit to vary the tension in said belt connection.

JOSEPH B. KUCERA.

REFERENCES CITED

The following references are of record in the file of this patent:

UNITED STATES PATENTS

| Number | Name | Date |
|---|---|---|
| 1,189,378 | Mohr | July 4, 1916 |
| 1,928,551 | Ball | Sept. 26, 1933 |

FOREIGN PATENTS

| Number | Country | Date |
|---|---|---|
| 480,979 | France | Oct. 19, 1916 |